UNITED STATES PATENT OFFICE.

ABBY D. SLOCOMB AND JENNIE W. DAY, OF NEW ORLEANS, LOUISIANA.

DEODORIZING PERSPIRATION-POWDER.

SPECIFICATION forming part of Letters Patent No. 279,195, dated June 12, 1883.

Application filed December 26, 1882. (No specimens.)

*To all whom it may concern:*

Be it known that we, ABBY DAY SLOCOMB and JENNIE WHITING DAY, citizens of the United States, residing in New Orleans, in the parish of Orleans and State of Louisiana, have invented a new and useful composition of matter to be used for the prevention or removal of odors caused by perspiration, of which the following is a specification.
Our composition consists of the following ingredients in six equal parts, combined in the proportions stated, viz: bicarbonate of soda, four parts; corn-starch, one part; rice-flour, one part. Perfume must be added to suit the taste. These ingredients are to be thoroughly mingled and carefully sifted.

The above-named composition is to be used as a powder, and to be either dusted or rubbed upon the surface of the skin.

By the use of the above composition perspiration is entirely deodorized, though the natural action of the pores of the skin is in no way affected.

What we claim, and desire to secure by Letters Patent of the United States, is—

The herein-described composition of matter to be used for the prevention or removal of odors caused by perspiration, consisting of bicarbonate of soda, corn-starch, and rice-flour, in the proportions specified, with the addition of perfume, as herein also specified.

ABBY DAY SLOCOMB.
   JENNIE WHITING DAY.

Witnesses:
 LEIGHTON WILLIAMS,
 EDWARD H. DIXON.